US012320475B2

(12) United States Patent
Hu

(10) Patent No.: US 12,320,475 B2
(45) Date of Patent: Jun. 3, 2025

(54) BULB STRUCTURE

(71) Applicant: Xiaoyan Hu, Yangjiang (CN)

(72) Inventor: Xiaoyan Hu, Yangjiang (CN)

( * ) Notice: Subject to any disclaimer, the term of this patent is extended or adjusted under 35 U.S.C. 154(b) by 0 days.

(21) Appl. No.: 19/001,583

(22) Filed: Dec. 26, 2024

(65) Prior Publication Data

US 2025/0129899 A1 Apr. 24, 2025

(51) Int. Cl.
*F21K 9/235* (2016.01)
*F21K 9/232* (2016.01)
*F21K 9/237* (2016.01)

(52) U.S. Cl.
CPC .............. *F21K 9/235* (2016.08); *F21K 9/232* (2016.08); *F21K 9/237* (2016.08)

(58) Field of Classification Search
CPC ................................ F21K 9/235; F21K 9/238
See application file for complete search history.

(56) References Cited

U.S. PATENT DOCUMENTS

| | | | | |
|---|---|---|---|---|
| 11,293,596 | B1 * | 4/2022 | Wang | F21K 9/238 |
| 2003/0094886 | A1 | 5/2003 | Pan | |
| 2017/0299151 | A1 | 10/2017 | Luo | |
| 2017/0356602 | A1 | 12/2017 | Lin | |
| 2022/0042658 | A1 * | 2/2022 | Chen | F21K 9/238 |
| 2024/0210025 | A1 * | 6/2024 | Wu | F21K 9/90 |

* cited by examiner

*Primary Examiner* — Sean P Gramling
(74) *Attorney, Agent, or Firm* — Birchwood IP

(57) ABSTRACT

A bulb structure is provided. The bulb structure includes: a bulb body, a wick, a support, a negative cover, a positive base, and a positive cover; the wick is provided with a positive wire and a negative wire; the support is connected to a top of the bulb body; the negative cover is connected to the bulb body; the positive base is connected to the negative cover; the positive cover is connected to the positive base; the wick is located in the bulb body, and the positive wire extends upwards out of the support and the negative cover in sequence and is connected to the positive base, to enable the positive wire to be electrically connected to the positive cover.

10 Claims, 10 Drawing Sheets

BULB STRUCTURE

TECHNICAL FIELD

The present disclosure relates to the technical field of bulbs, and in particular, to a bulb.

BACKGROUND

Existing bulb production includes injection molding, welding, and other process steps. These production processes are complex and inefficient, causing high production costs.

SUMMARY

The present disclosure aims to overcome the shortcomings in the prior art and to provide a bulb structure.

In order to solve the above technical problems, the present disclosure adopts the following technical solutions:

The present disclosure provides a bulb structure, including: a bulb body, a wick, a support, a negative cover, a positive base, and a positive cover, wherein the wick is provided with a positive wire and a negative wire; the support is connected to a top of the bulb body; the negative cover is connected to the bulb body; the positive base is connected to the negative cover; the positive cover is connected to the positive base; the wick is located in the bulb body, and the positive wire extends upwards out of the support and the negative cover in sequence and is connected to the positive base, to enable the positive wire to be electrically connected to the positive cover; and the negative wire extends upwards out of a side wall of the support and is connected to an inner wall of the negative cover, to enable the negative wire to be electrically connected to the negative cover.

Compared with the prior art, the bulb structure of the present disclosure has the beneficial effects: The positive wire extends upwards out of the support and the negative cover in sequence and is connected to the positive base, so that the positive wire is electrically connected to the positive cover. The negative wire extends upwards out of the side wall of the support and is connected to the inner wall of the negative cover, so that the negative wire is electrically connected to the negative cover. Namely, the positive wire and the negative wire can be reliably electrically connected to the positive cover and the negative cover respectively, without welding. This mode achieves a weld-free process; the production process is significantly simplified; the overall production efficiency is improved; the production costs are reduced; and the practicability is high.

The present disclosure will be further described below in conjunction with the accompanying drawings and specific embodiments.

BRIEF DESCRIPTION OF THE DRAWINGS

To describe the technical solutions in the embodiments of the present disclosure more clearly, the following briefly introduces the accompanying drawings for describing the embodiments or the related art. Apparently, the accompanying drawings in the following description show merely some embodiments of the present disclosure, and a person of ordinary skill in the art may still derive other drawings according to these accompanying drawings without creative efforts.

DETAILED DESCRIPTION OF THE EMBODIMENTS

Figure 1:
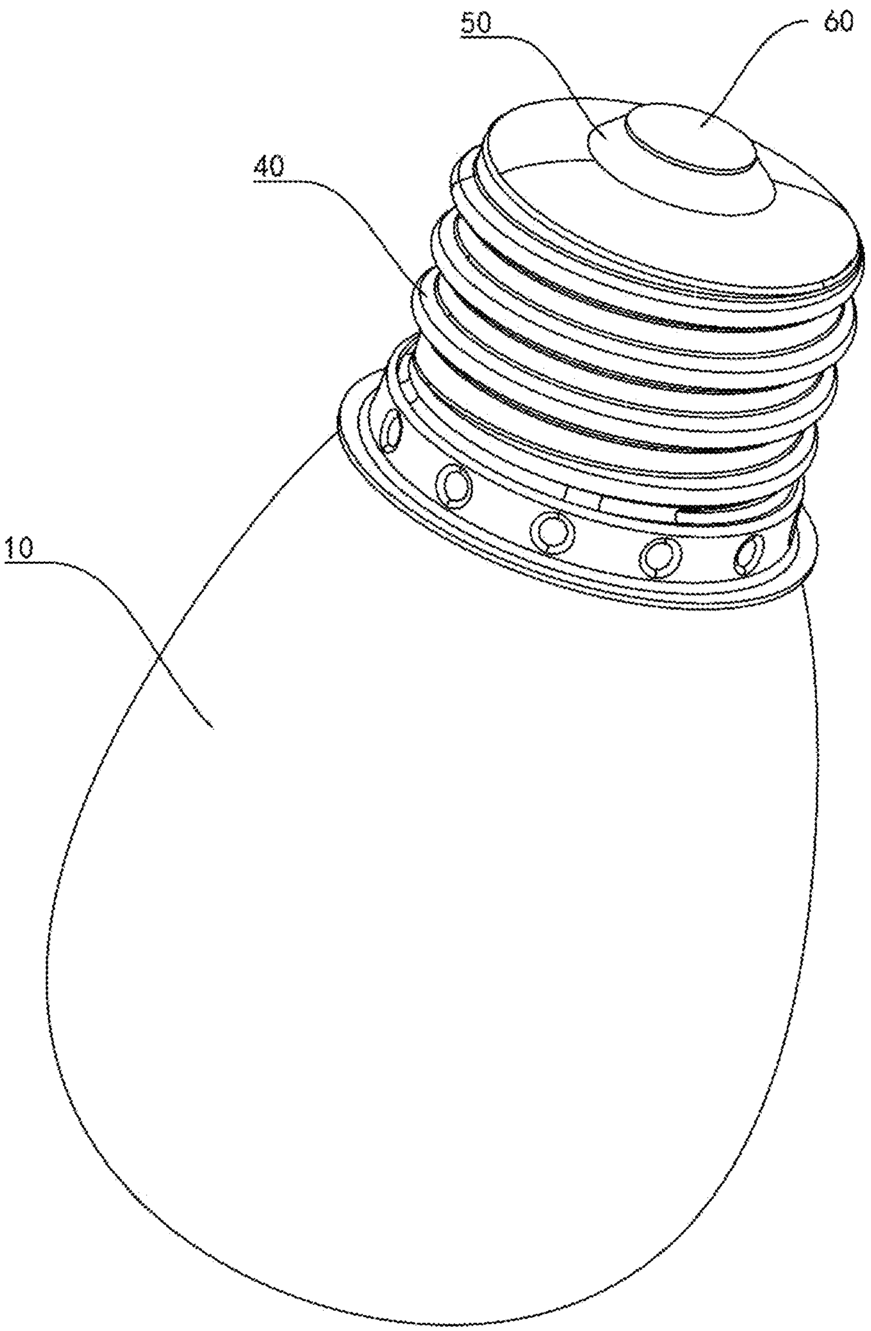
FIG. 1 is a three-dimensional diagram of a bulb structure according to the present disclosure.

To make the objectives, technical solutions, and advantages of the present disclosure clearer, the following is a further detailed explanation of the present disclosure in conjunction with the accompanying drawings and specific implementations.

Referring to specific embodiments shown in FIG. 1 to FIG. 10, the present disclosure discloses a bulb structure, including: a bulb body 10, a wick 20, a support 30, a negative cover 40, a positive base 50, and a positive cover 60. The wick 20 is provided with a positive wire 21 and a negative wire 22; the support 30 is connected to a top of the bulb body 10; the negative cover 40 is connected to the bulb body 10; the positive base 50 is connected to the negative cover 40; the positive cover 60 is connected to the positive base 50; the wick 20 is located in the bulb body 10, and the positive wire 21 extends upwards out of the support 30 and the negative cover 40 in sequence and is connected to the positive base 50, to enable the positive wire 21 to be electrically connected to the positive cover 60; and the negative wire 22 extends upwards out of a side wall of the support 30 and is connected to an inner wall of the negative cover 40, to enable the negative wire 22 to be electrically connected to the negative cover 40.

Specifically, the positive wire 21 extends upwards out of the support 30 and the negative cover 40 in sequence and is connected to the positive base 50, so that the positive wire 21 is electrically connected to the positive cover 60. The negative wire 22 extends upwards out of the side wall of the support 30 and is connected to the inner wall of the negative cover 40, so that the negative wire 22 is electrically connected to the negative cover 40. Namely, the positive wire 21 and the negative wire 22 can be reliably electrically connected to the positive cover 60 and the negative cover 40 respectively, without welding. This mode achieves a weld-free process; the production process is significantly simplified; the overall production efficiency is improved; the production costs are reduced; and the practicability is high. In addition, by using the weld-free process, operations on a production line are smoother, thereby reducing the waiting time and quality control procedures caused by welding. Meanwhile, since possible problems such as a welding defect and damage to the wick 20 during the welding are avoided, this bulb structure has a higher yield and more stable production efficiency in the production process. This not only helps shorten the product delivery cycle, but also better meets a market demand for high-quality bulb products. In addition, a welding process requires a large amount of energy and a large number of materials and human resources, and welding equipment needs to be regularly repaired and maintained. By using the weld-free process, the production costs are significantly reduced. On the one hand, welding equipment, welding consumables, and labor costs are reduced. On the other hand, due to the simplification of the production process, the scrap rate and the rework rate are reduced, which further reduces the production costs. In addition, the weld-free process avoids problems such as thermal stress, oxidation, and corrosion that may occur in the welding process, thereby improving the stability and reliability of the bulb structure. In addition, as electrical connection is achieved through physical contact, the bulb structure has better conductivity and lower contact resistance, which helps prolong the service life of a bulb and improve the performance of the bulb.

Figure 2:
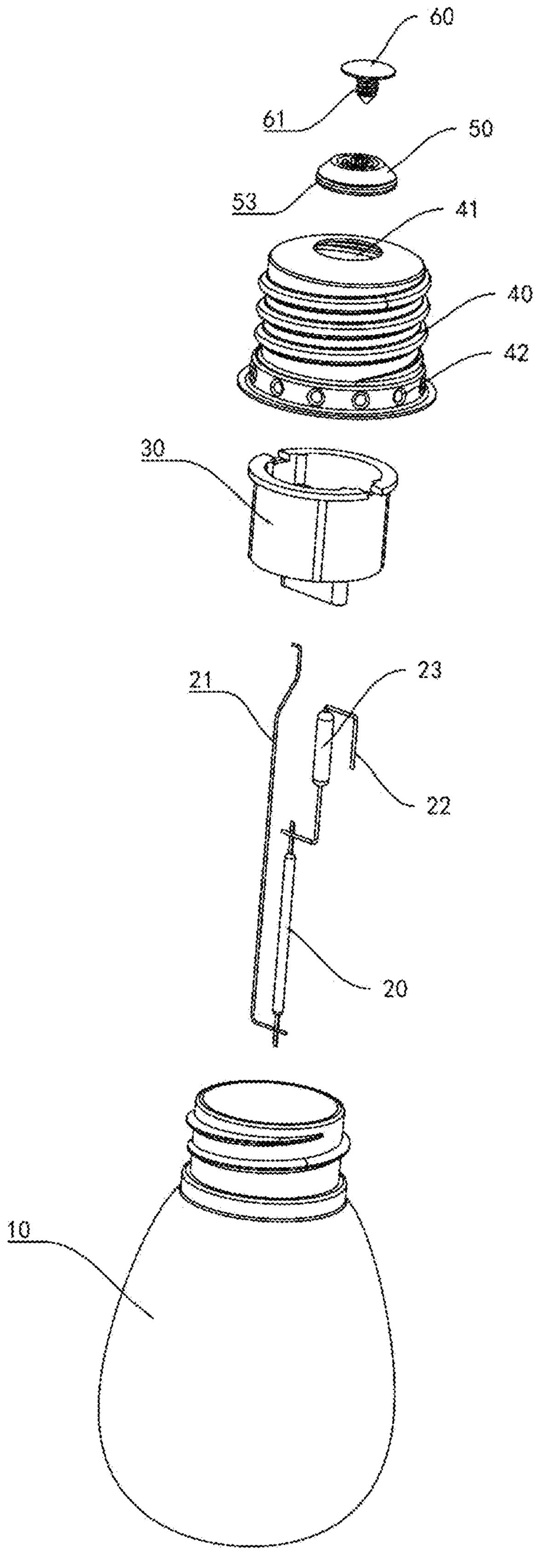
FIG. 2 is an exploded view of a bulb structure according to the present disclosure.
Figure 8:
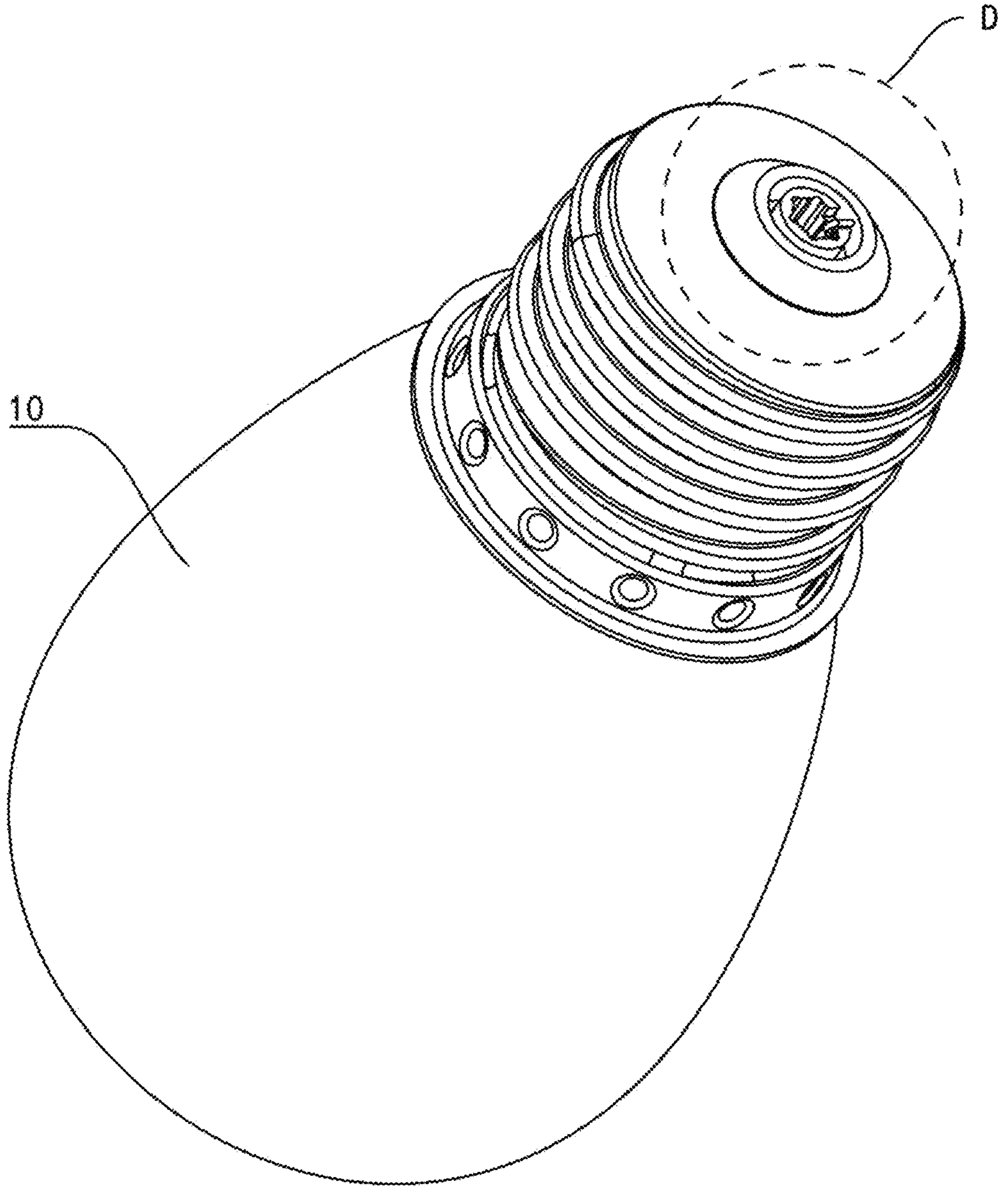
FIG. 8 is a schematic internal diagram II of a bulb structure according to the present disclosure.
Figure 9:
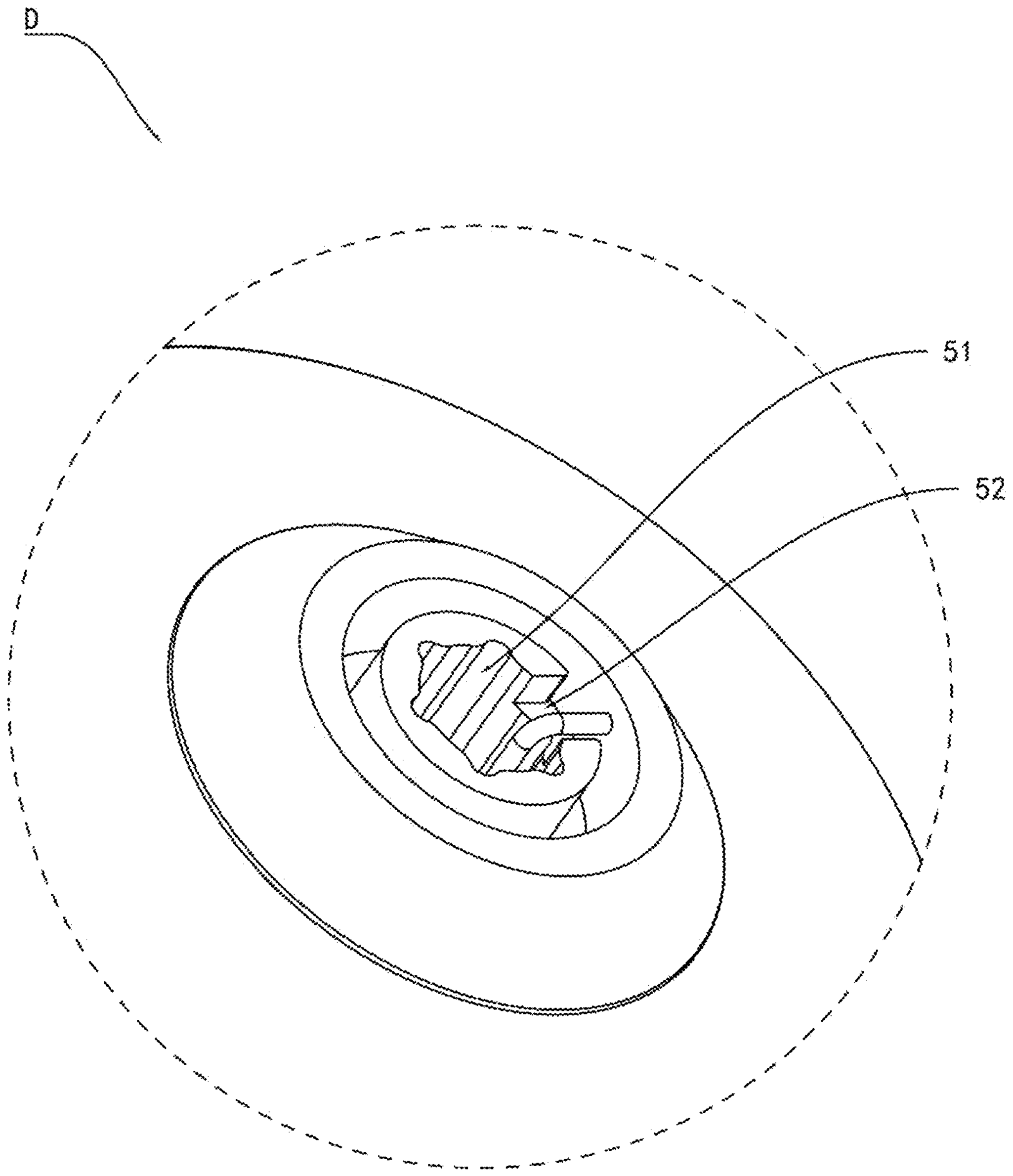
FIG. 9 is a partially enlarged view of D in FIG. 8.
Figure 10:
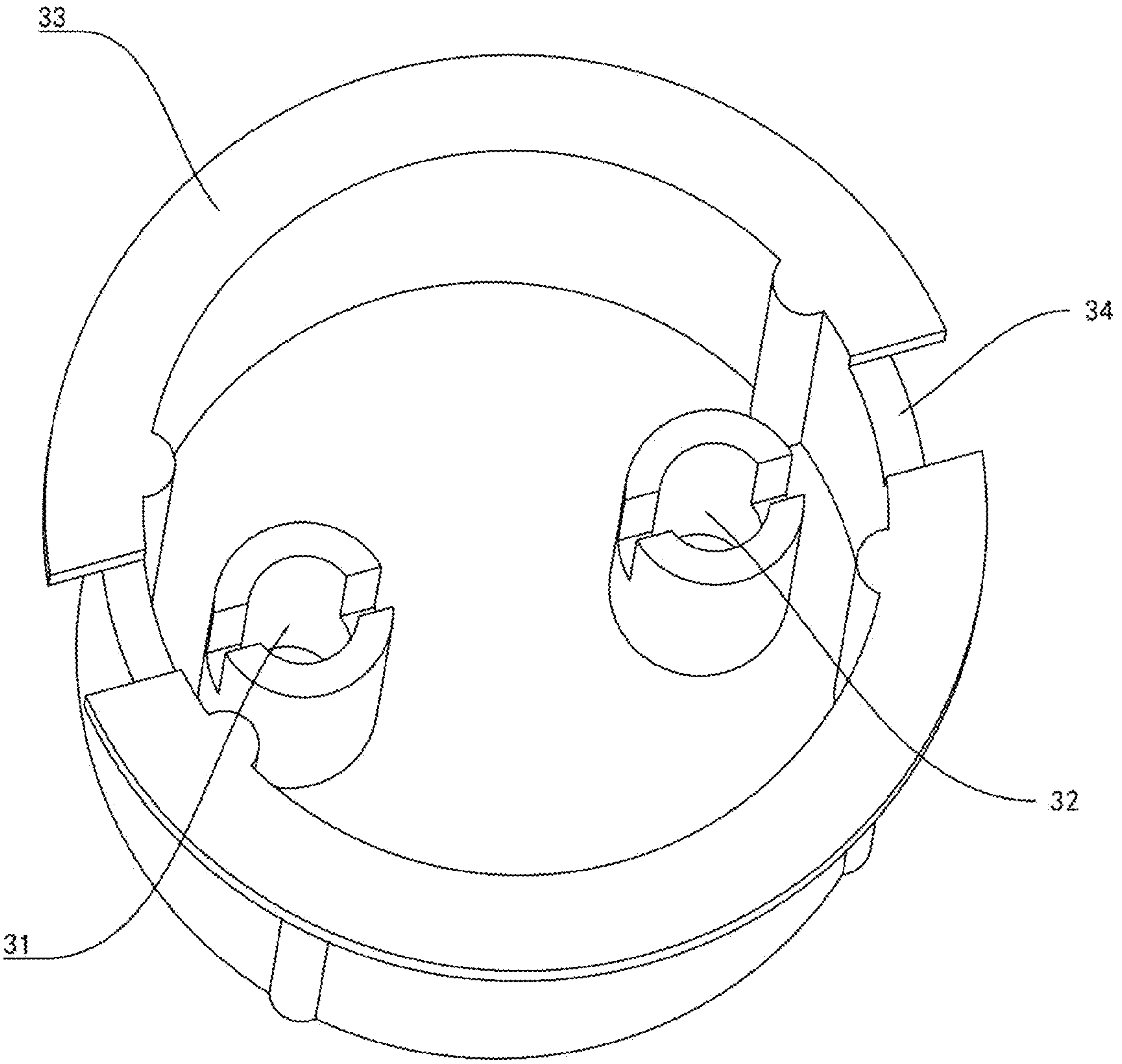
FIG. 10 is a schematic structural diagram of a support according to the present disclosure.

Referring to FIG. 2, FIG. 8, and FIG. 9, in an embodiment, a groove 51 is provided in an axial direction in an inner side of the positive base 50; a first gap 52 is provided in a top of the groove 51; and the positive wire 21 is abutted against the groove 51 and extends out of the first gap 52.

Specifically, there are several grooves 51 which are uniformly distributed on the inner side of the positive base 50. The first notch 52 is provided in the top of one groove 51, and the groove 51 is configured to achieve connection and fixing of the positive cover 60. The groove 51 is ingeniously designed in the axial direction in the inner side of the positive base 50, and the first notch 52 is provided in the top of the groove 51, so that effective fixation and protection on the positive wire 21 are achieved. When the positive wire 21 is placed in the groove 51 in an abutting manner and extends out of the first notch 52, its position is accurately fixed. What is of particular importance is that in a process of inserting the positive cover 60 into the positive base 50, the positive cover 60 naturally presses the positive wire 21 into a region of the groove 51. This design not only improves the stability of the positive wire 21 during assembling, but also significantly lowers the risk of displacement of the positive wire 21 during use. In addition, through this structural design, the electrical connection between the positive wire 21 and the positive cover 60 is more firmly established, and the reduction of displacement means that the stability and reliability of an electrical connection point are improved, thereby ensuring the stability and safety of the entire bulb structure during long-term operation. In addition, this design further helps to lower the risk of a circuit fault or a short circuit that may occur due to the displacement of the positive wire 21, thereby further prolonging the service life of the product and improving the overall performance.

Figure 3:
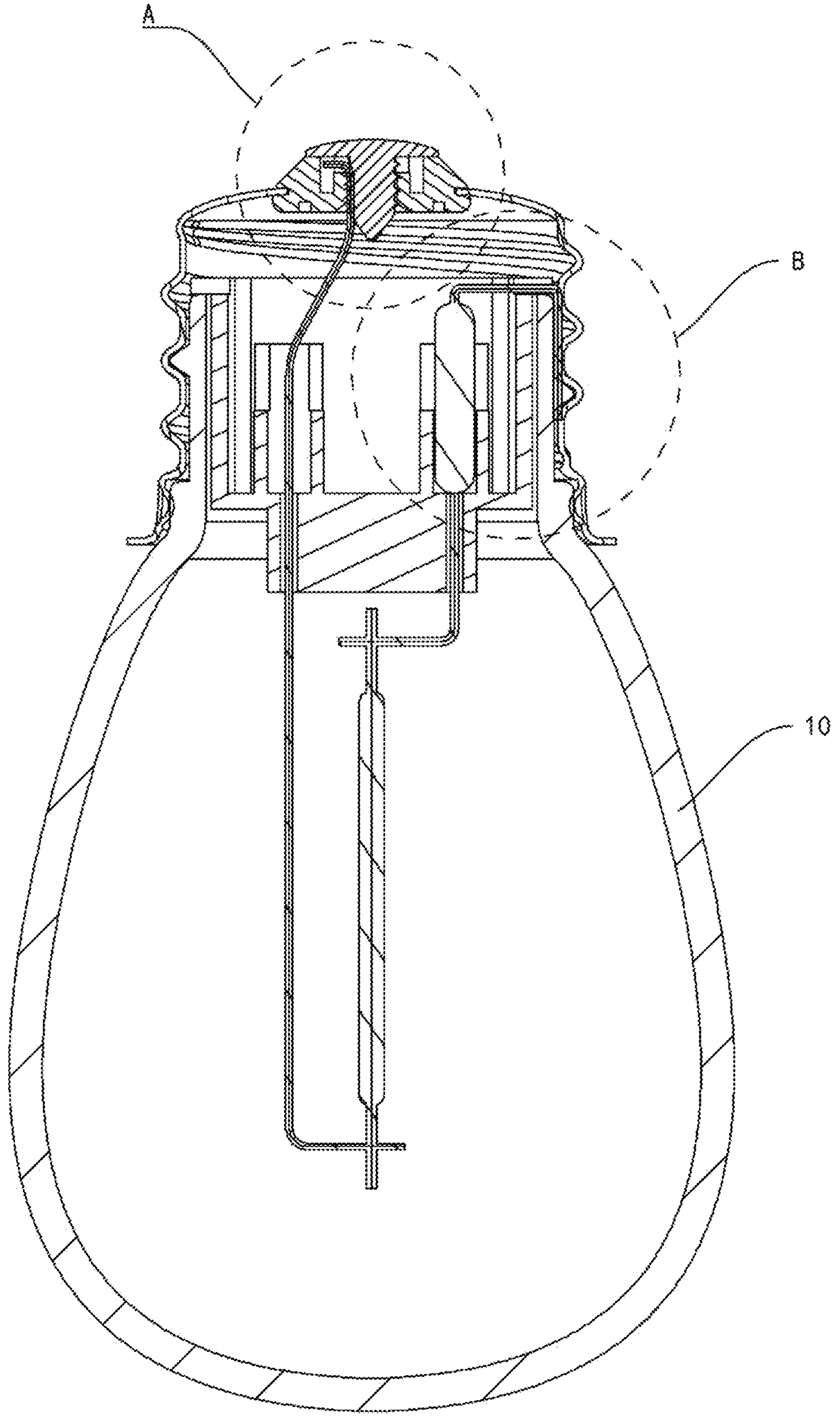
FIG. 3 is a cross-sectional view of a bulb structure according to the present disclosure.
Figure 4:
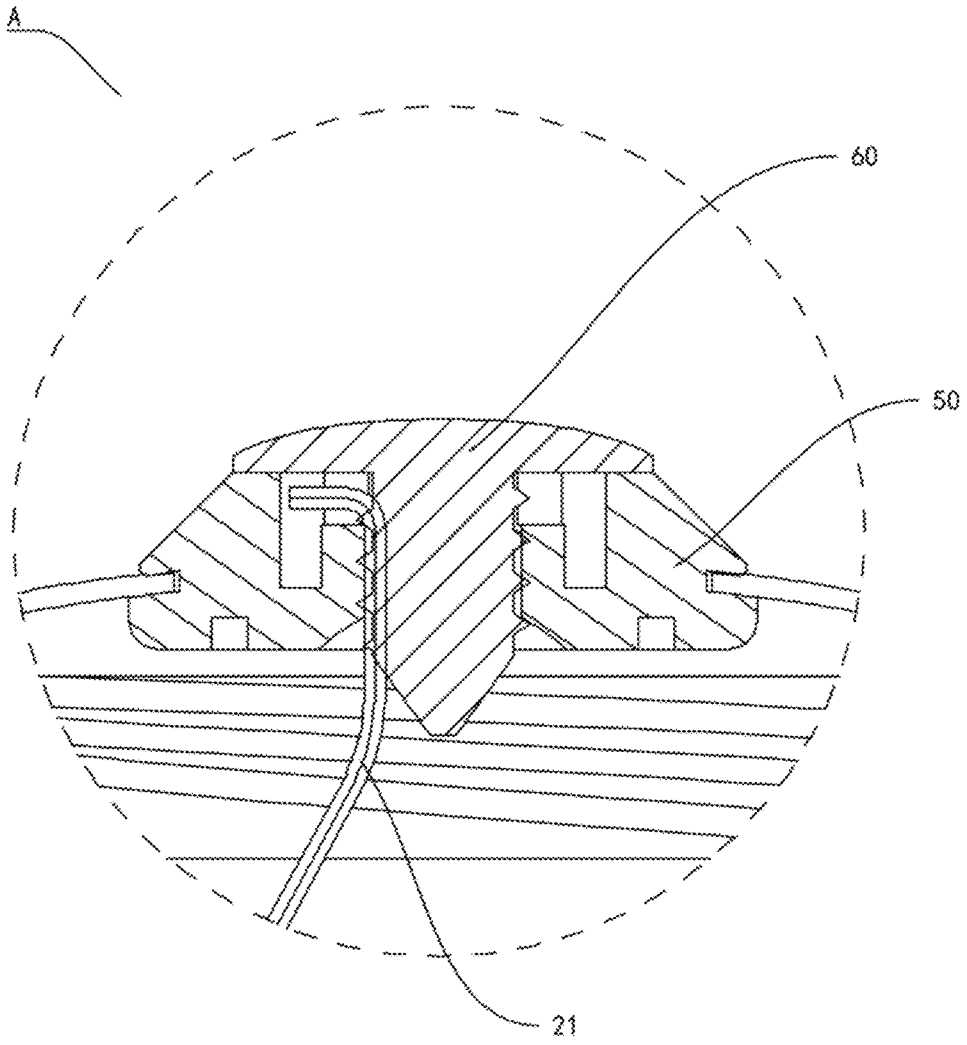
FIG. 4 is a partially enlarged view of A in FIG. 3.
Figure 5:
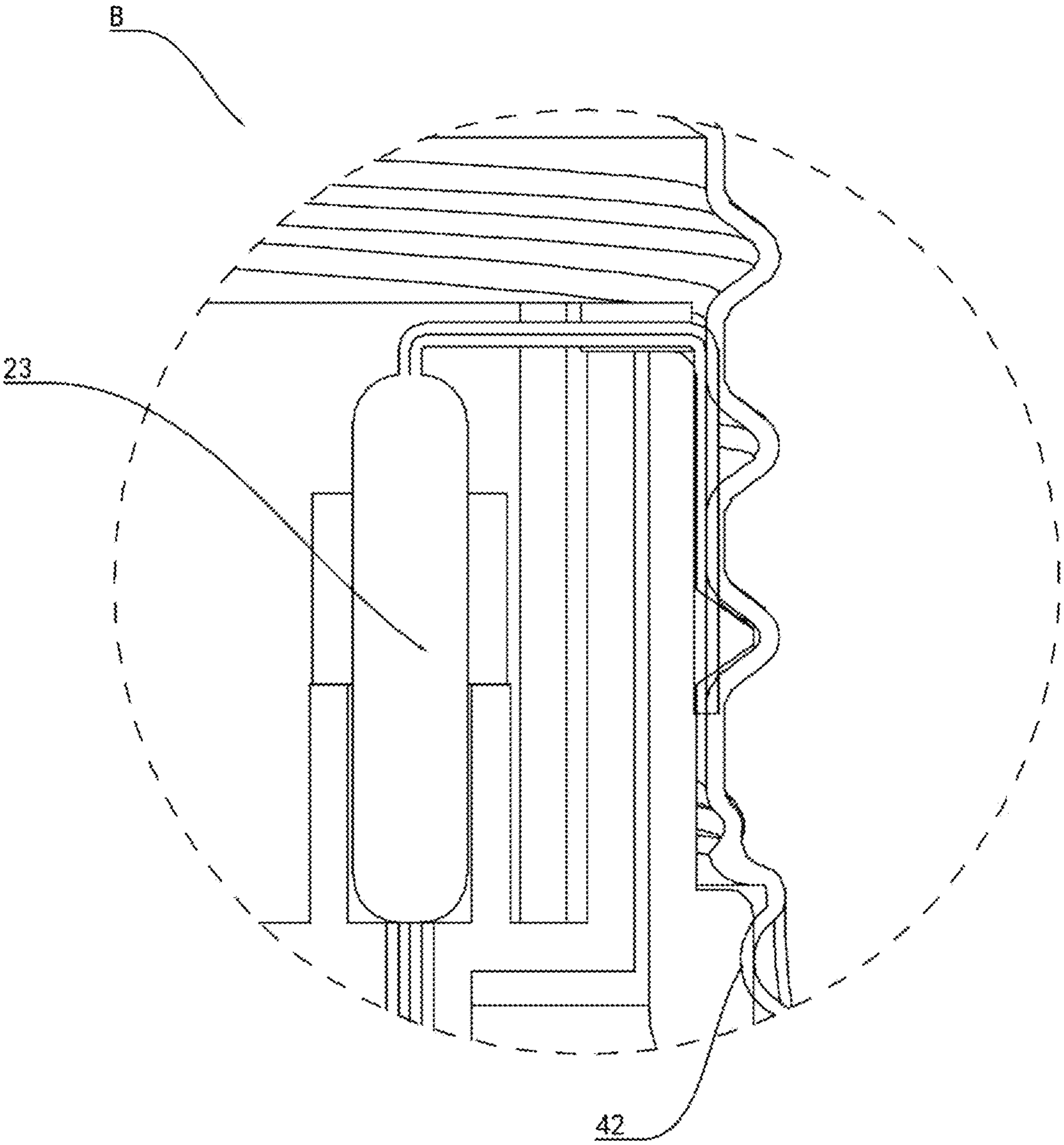
FIG. 5 is a partially enlarged view of B in FIG. 3.
Figure 6:
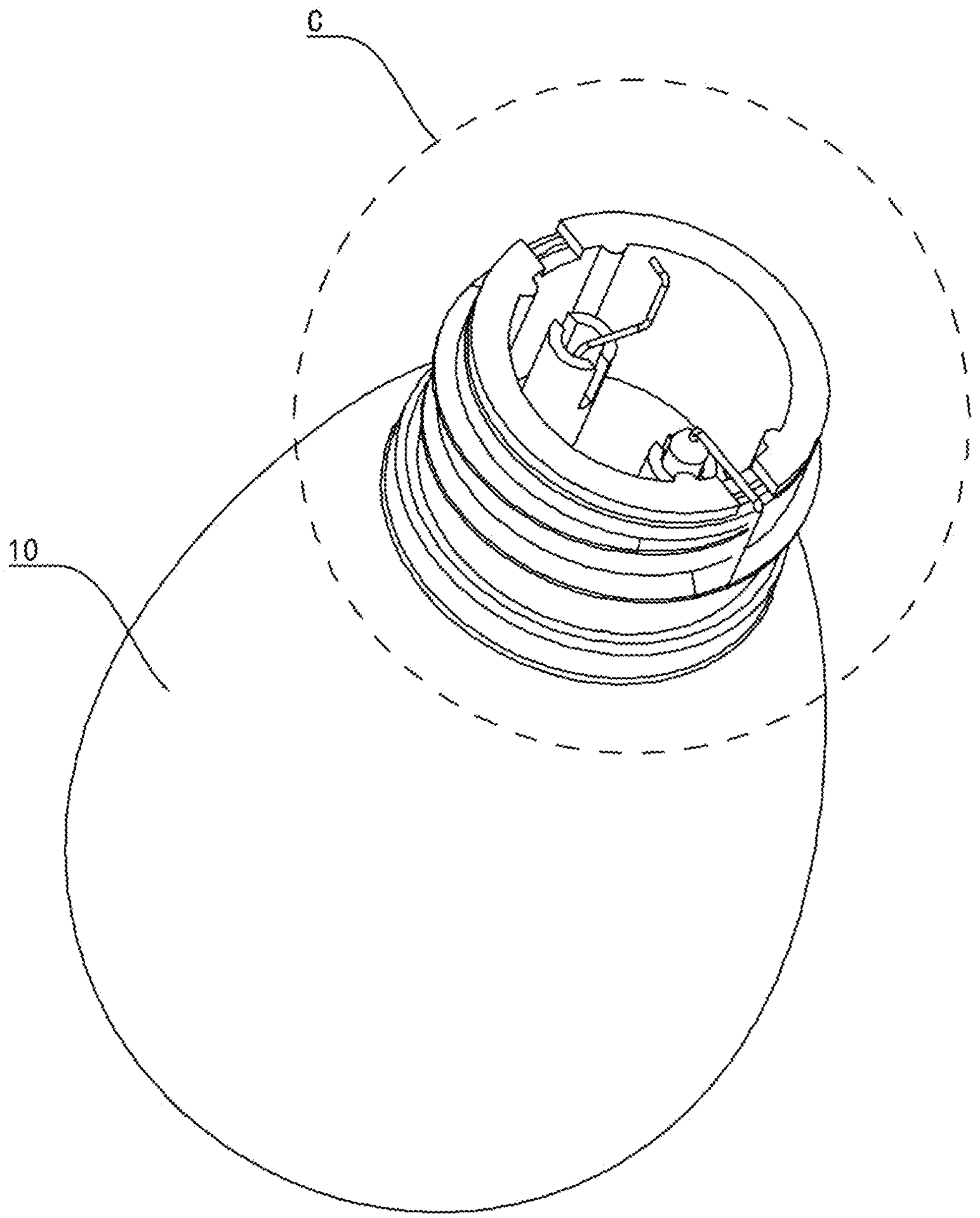
FIG. 6 is a schematic internal diagram I of a bulb structure according to the present disclosure.
Figure 7:
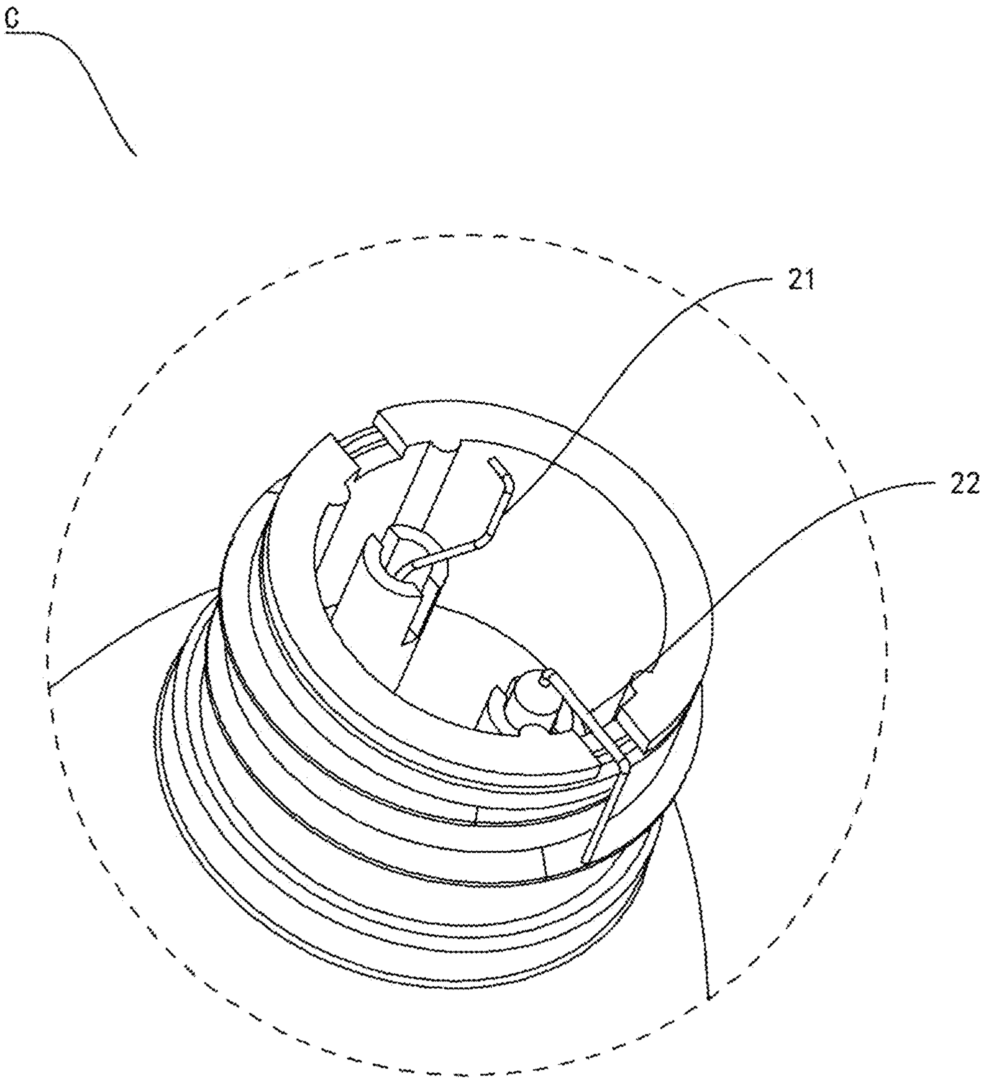
FIG. 7 is a partially enlarged view of C in FIG. 6.

Referring to FIG. 2 to FIG. 4, in an embodiment, the positive cover 60 is provided with a threaded layer 61; and the threaded layer 61 is configured to press the positive wire 21.

Specifically, by designing the threaded layer 61 on the positive cover 60, effective pressing and limiting of the positive wire 21 is ingeniously achieved. This design not only enhances physical contact between the positive cover 60 and the positive wire 21, but also significantly improves the stability of the positive wire 21 during assembling and use through the tight fit of the threaded layer 61. When the positive cover 60 is pressed into the positive base 50, its threaded layer 61 may tightly abut against and press the positive wire 21, to form a firm locking mechanism. This mechanism effectively prevents the positive wire 21 from moving during vibration, impact, or long-term use, thereby ensuring the stability and reliability of the electrical connection between the positive wire 21 and the positive cover 60. In addition, the design of the threaded layer 61 further brings additional advantages. It can, to an extent, disperse and buffer external stress and lower the risk of damage to the positive wire 21 or a circuit failure caused by stress concentration. Meanwhile, the tight fit of the threaded layer 61 also helps to improve the current transmission efficiency and reduce energy loss, thus improving the performance and efficiency of the entire bulb structure.

Referring to FIG. 2 to FIG. 4, in an embodiment, the positive base 50 is provided with an annular clamping slot 53. An opening 41 corresponding to the annular clamping slot 53 is provided in the negative cover 40.

Specifically, by designing the annular clamping slot 53 in a middle section of the positive base 50 and providing the opening 41 corresponding to the annular clamping slot 53 in the negative cover 40, a unique and effective sealed connection between the positive base 50 and the negative cover 40 is achieved. This design not only improves the stability of the connection between the positive base 50 and the negative cover 40, but also significantly improves the sealing performance. In addition, the cooperation between the annular clamping slot 53 and the opening 41 forms a tight locking mechanism. When the negative cover 40 is mounted on the positive base 50, the opening 41 can be accurately embedded into the annular clamping slot 53, thereby achieving a stable connection between them. This connection mode not only effectively prevents external moisture, dust, or other pollutants from entering the bulb structure, avoiding negative effects on the performance of the bulb, but also ensures stable operation of the bulb under various environmental conditions. In addition, the sealed connection between the annular clamping slot 53 and the opening 41 also helps to improve the safety of the bulb structure.

Referring to FIG. 3, FIG. 5, FIG. 6, FIG. 7, and FIG. 10, in an embodiment, the support 30 is provided with a positive channel 31 and a negative channel 32 in the axial direction; the positive wire 21 extends out along the positive channel 31; and the negative wire 22 extends out along the negative channel 32.

Specifically, by ingeniously designing the positive channel 31 and the negative channel 32 in the axial direction on the support 30, orderly and separated extension of the positive wire 21 and the negative wire 22 is achieved. This design not only optimizes a spatial layout inside the bulb, but also significantly improves the stability and the safety. In addition, the separated design of the positive channel 31 and the negative channel 32 ensures that the positive wire 21 and the negative wire 22 do not interfere with each other or do not in contact with each other during the extension, thus effectively avoiding the risk of a short circuit. In addition, the orderly arrangement of the positive channel 31 and the negative channel 32 also facilitates the assembling process of the bulb. Production personnel can easily follow channel guidelines to respectively connect the positive wire 21 and the negative wire 22 to corresponding electrode cover positions, without worrying about wire confusion or mounting errors. This not only improves the production efficiency, but also reduces a failure rate caused by an assembling error.

Referring to FIG. 2, FIG. 3, FIG. 5, FIG. 6, FIG. 7, and FIG. 10, in an embodiment, a middle section of the positive wire 21 and/or a middle section of the negative wire 22 is connected with a resistor 23; and the resistor 23 is mounted in the positive channel 31 and/or the negative channel 32.

Specifically, by flexibly arranging the resistor 23 on the positive wire 21 and/or the negative wire 22, and cleverly mounting the resistor in the positive channel 31 and/or the negative channel 32, precise control of current is achieved, and a significant limiting effect and a space saving advantage are achieved. This design greatly improves the flexibility and efficiency of bulb production, and also improves the reliability and safety of the product. In addition, the addition of the resistor 23 can not only adjust a magnitude of current according to an actual need of bulb production, thereby ensuring that the bulb emits light and generates heat within a normal working range, but also play a limiting role in the positive channel 31 and/or the negative channel 32 through its physical size and shape. This limiting design effectively prevents the resistor 23 from shaking or being misaligned in the channel, thereby ensuring a stable connection between the wires and the electrode covers, and improving the electrical performance and durability of the bulb. In addition, the resistor 23 is directly mounted into the positive channel 31 and/or the negative channel 32, so that the spaces inside the channels are fully used, thereby avoiding the need for additionally arranging a limiting structure or assembly. This design not only simplifies the internal structure of the bulb and reduces the production costs, but also makes the whole bulb more compact, lighter, and easier to mount and transport. In addition, this technological feature further reflects the optimization of the material utilization rate. The proper design and layout of the resistor 23 meet the needs for current control and position limitation, and reduce a waste of materials to the greatest extent. This meets the requirements of the modem manufacturing industry for energy conservation, emission reduction, and sustainable development.

Referring to FIG. 3, in an embodiment, an annular boss 33 is arranged at a top of the support 30; and the annular boss 33 is abutted against the bulb body 10.

Specifically, by designing the annular boss 33 at the top of the support 30 and forming an abutment structure with the bulb body 10, a stable and reliable connection between the support 30 and the bulb body 10 is achieved. This design not only improves the overall stability and safety of the bulb, but also brings technical effects in many aspects. Firstly, the abutment structure between the annular boss 33 and the top of the bulb body 10 effectively enhances the supporting effect of the support 30 on the bulb body 10. This design enables the support 30 to fix the bulb body 10 more firmly and prevent the bulb body 10 from shaking or falling off during mounting or use, thereby ensuring the stability and safety of the bulb. Secondly, the design of the annular boss 33 also helps to achieve a sealing property of the bulb. When the annular boss 33 is tightly abutted against the top of the bulb body 10, an effective sealing barrier can be formed to prevent external dust, moisture, and other impurities from entering the bulb, thereby protecting electrical elements and lines inside the bulb from being damaged. More importantly, the design further reflects the optimization of the material utilization rate. Reasonably designing the size and shape of the annular boss 33 not only meets the needs for supporting and sealing, but also reduces a waste of materials to the greatest extent. This meets the requirements of the modem manufacturing industry for energy conservation, emission reduction, and sustainable development.

Referring to FIG. 2, FIG. 6, FIG. 7, and FIG. 10, in an embodiment, a second gap 34 is provided in the annular boss 33; and the negative wire 22 extends out of the second gap 34.

Specifically, by cleverly providing the second notch 34 in the annular boss 33 and enabling the negative wire 22 to extend out of the second notch 34, orderly and safe exporting of the negative wire 22 from the bulb is achieved. This design not only optimizes the internal structural layout of the bulb, but also brings technical effects in many aspects. Firstly, the provision of the second gap 34 provides a convenient channel for the exporting of the negative wire 22. In the assembling process of the bulb, the negative wire 22 can easily extend out through the second gap 34 and be connected to the negative cover 40, without an additional operation of threading a wire through a hole or winding the wire, thereby simplifying the assembling procedure and improving the production efficiency. Secondly, this design improves the stability and safety of the negative wire 22 in the bulb. The negative wire 22 is clearly positioned because it is exported through the second gap 34, thus avoiding arbitrary swinging inside the bulb or unnecessary contact with other components, and then lowering the risk of an electrical fault or a short circuit. In addition, the provision of the second gap 34 also helps to improve the sealing performance of the bulb. Based on the tight abutment between the annular boss 33 and the bulb body 10, the design of the second gap 34 can ensure that the negative wire 22 will not damage the sealing structure of the bulb when it is exported, thereby preventing external dust, moisture, and other impurities from entering the bulb through the wire, and ensuring the cleanliness and dryness of an internal environment of the bulb.

Referring to FIG. 2, FIG. 5, FIG. 6, and FIG. 7, in an embodiment, an end portion of the negative wire 22 is 7-shaped; and an end portion of the negative wire 22 is hooked to the second gap 34.

Specifically, since the end portion of the negative wire 22 is designed to be 7-shaped and is cleverly hooked to the second notch 34, stable connection and convenient exporting of the negative wire 22 in the bulb are achieved. This innovative design not only improves the structural stability of the bulb, but also brings technical effects in many aspects. Firstly, the negative wire 22 with the 7-shaped end portion is hooked to the second notch 34, so that a stable mechanical connection is achieved. Compared with a traditional welding or plugging mode, this connection method has higher connection strength and stability, which effectively prevents the negative wire 22 from falling off or being loosened due to a force or vibration during use, thereby ensuring the electrical performance and safety of the bulb. Secondly, this design simplifies the assembling procedure of the bulb. The negative wire 22 with the 7-shaped end portion can be directly hooked to the second gap 34, without a complex welding or plugging operation, thereby improving the assembling efficiency and reducing the production costs. Meanwhile, this connection mode also facilitates subsequent maintenance and replacement operations, which reduces the maintenance costs. In addition, the negative wire 22 with the 7-shaped end portion is hooked to the second gap 34, which can effectively avoid interference with other electrical elements or lines. This design ensures that the layout of the negative wire 22 inside the bulb is proper and orderly, and prevents an electrical fault or a potential safety hazard caused by wire interweaving or overlapping.

Referring to FIG. 1 to FIG. 3, in an embodiment, the negative cover 40 is in threaded connection to the bulb body 10 to cause the negative wire 22 to be abutted against the inner wall of the negative cover 40.

Specifically, the negative cover 40 is fixed to the bulb body 10 by threaded connection, and the negative wire 22 is ensured to be tightly abutted against the inner wall of the negative cover 40, so that stable connection and efficient conduction of the negative wire 22 in the bulb are achieved. This design not only improves the electrical performance of the bulb, but also brings technical effects in many aspects. Firstly, a strong mechanical connection is formed between the negative cover 40 and the bulb body 10 which are in threaded connection. This connection mode has high strength and durability, and can effectively prevent the negative cover 40 from being loosened or falling off due to a force or vibration during use, thereby ensuring a stable connection between the negative wire 22 and the bulb body 10, and improving the reliability and safety of the bulb. Secondly, the tight abutment between the negative wire 22 and the inner wall of the negative cover 40 ensures good electrical contact. This design reduces the contact resistance, improves the current transmission efficiency, and enables the bulb to maintain stable brightness and power outputting during operation. Meanwhile, the close electrical contact also helps prevent an electrical fault or a short circuit, which further improves the electrical performance of the bulb. In addition, the negative cover 40 in threaded connection also facilitates subsequent maintenance and replacement operations. More importantly, the design further reflects the optimization of the overall structure of the bulb. By fixing the negative cover 40 in the threaded connection way, the internal structure of the bulb can be made more compact and orderly, thus increasing the space utilization rate. Meanwhile, the threaded connection of the negative cover 40 also improves the stability of the bulb, making it more stable and reliable during mounting and use.

Referring to FIG. 1 to FIG. 3, and FIG. 5, in an embodiment, the negative cover 40 is provided with several inward protrusions 42 in a radial direction, and the inward protrusions 42 are configured to be abutted against the bulb lamp 10.

Specifically, the several inward protrusions 42 are arranged at a lower end of the negative cover 40 in the radial direction, and these inward protrusions 42 are used to form an interference fit with the bulb body 10, so that a tight connection and efficient sealing between the negative cover 40 and the bulb body 10 are achieved. This innovative design not only significantly improves the sealing performance of the bulb, but also brings technical effects in many aspects. Firstly, the arrangement of the inward protrusions 42 enhances the connection strength of the negative cover 40 and the bulb body 10. These inward protrusions 42 can be tightly abutted against and press the bulb body 10, thus forming a firm mechanical connection, which effectively prevents the bulb body 10 from being loosened or falling off due to a force or vibration during use. This design improves the overall stability and reliability of the bulb and ensuring a stable connection between the negative cover 40 and the bulb body 10. Secondly, the interference fit formed between the inward protrusions 42 and the bulb body 10 significantly improves the sealing performance of the bulb. Through the tight contact and pressing, the inward protrusions 42 can effectively prevent external dust, moisture, and other impurities from entering the bulb, thus maintaining the cleanliness and dryness of the internal environment of the bulb. This is of great significance of prolonging the service life of the bulb, improving the electrical performance of the bulb, and preventing an electrical fault. In addition, the design further reflects the optimization of a bulb manufacturing process. By precisely controlling the shape, quantity, and distribution of the inward protrusions 42, the sealing performance can be precisely controlled, thereby meeting requirements of different application scenarios for the sealing performance of the bulb. Meanwhile, the design also simplifies the assembling procedure of the bulb, and reduces the production costs and the manufacturing difficulty.

The above embodiments are preferred implementation schemes of the present disclosure. In addition, the present disclosure can also be implemented in other ways, and any obvious replacement made without departing from the concept of the technical solution shall fall within the scope of protection of the present disclosure.

What is claimed is:

1. A bulb structure, comprising: a bulb body, a wick, a support, a negative cover, a positive base, and a positive cover, wherein the wick is provided with a positive wire and a negative wire; the support is connected to a top of the bulb body; the negative cover is connected to the bulb body; the positive base is connected to the negative cover; the positive cover is connected to the positive base; the wick is located in the bulb body, and the positive wire extends upwards out of the support and the negative cover in sequence and is connected to the positive base, to enable the positive wire to be electrically connected to the positive cover; and the negative wire extends upwards out of a side wall of the support and is connected to an inner wall of the negative cover, to enable the negative wire to be electrically connected to the negative cover;

wherein a groove is provided in an axial direction in an inner side of the positive base; a first gap is provided in a top of the groove; and the positive wire is abutted against the groove and extends out of the first gap.

2. The bulb structure according to claim 1, wherein the positive cover is provided with a threaded layer; and the threaded layer is configured to press the positive wire.

3. The bulb structure according to claim 1, wherein the positive base is provided with an annular clamping slot; and an opening corresponding to the annular clamping slot is provided in the negative cover.

4. The bulb structure according to claim 1, wherein the support is provided with a positive channel and a negative channel in the axial direction; the positive wire extends out along the positive channel; and the negative wire extends out along the negative channel.

5. The bulb structure according to claim 4, wherein a middle section of the positive wire and/or a middle section of the negative wire is connected with a resistor; and the resistor is mounted in the positive channel and/or the negative channel.

6. The bulb structure according to claim 1, wherein an annular boss is arranged at a top of the support; and the annular boss is abutted against the bulb body.

7. The bulb structure according to claim 6, wherein a second gap is provided in the annular boss; and the negative wire extends out of the second gap.

8. The bulb structure according to claim 7, wherein an end portion of the negative wire is 7-shaped; and an end portion of the negative wire is hooked to the second gap.

9. The bulb structure according to claim 8, wherein the negative cover is in threaded connection to the bulb body to cause the negative wire to be abutted against the inner wall of the negative cover.

10. The bulb structure according to claim 1, wherein the negative cover is provided with several inward protrusions in a radial direction, and the inward protrusions are configured to be abutted against a bulb lamp.

* * * * *